US009651972B2

(12) United States Patent
Takahashi et al.

(10) Patent No.: US 9,651,972 B2
(45) Date of Patent: May 16, 2017

(54) DEMAND REGULATING SYSTEM, DEMAND REGULATING APPARATUS, AND CONSUMPTION DEVICE MANAGEMENT APPARATUS

(71) Applicant: HITACHI, LTD., Tokyo (JP)

(72) Inventors: Hirotaka Takahashi, Tokyo (JP); Yasushi Tomita, Tokyo (JP); Ikuma Sugamata, Tokyo (JP); Maki Hayashi, Tokyo (JP); Kahoru Kakimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 14/281,971

(22) Filed: May 20, 2014

(65) Prior Publication Data

US 2014/0350741 A1 Nov. 27, 2014

(30) Foreign Application Priority Data

May 22, 2013 (JP) .................................. 2013-108348

(51) Int. Cl.
*H02J 3/14* (2006.01)
*G05F 1/66* (2006.01)

(52) U.S. Cl.
CPC .................. *G05F 1/66* (2013.01); *H02J 3/14* (2013.01); *H02J 2003/143* (2013.01);
(Continued)

(58) Field of Classification Search
CPC ......... G05F 1/66; H02J 3/14; H02J 2003/143; Y02B 70/3225; Y02B 70/3266; Y04S 20/222; Y04S 20/242
(Continued)

(56) References Cited

U.S. PATENT DOCUMENTS 5,572,438 A * 11/1996 Ehlers .................. G01R 21/133
307/37
8,396,601 B2 3/2013 Tomita et al.
(Continued)

FOREIGN PATENT DOCUMENTS

JP 2008-125295 A 5/2008
JP 2010-75015 A 4/2010
(Continued)

OTHER PUBLICATIONS

Extended European Search Report received in corresponding European Application No. 14169471.1 dated Nov. 26, 2015.
(Continued)

*Primary Examiner* — Robert Fennema
*Assistant Examiner* — Jigneshkumar Patel
(74) *Attorney, Agent, or Firm* — Mattingly & Malur, PC

(57) ABSTRACT

The priority of a demand regulating control for a device is changed in accordance with a simple operation by a consumer. A demand regulating system has an operation unit that selects from among a plurality of consumption devices, on the basis of priority information and a regulating quantity, a plurality of control-target devices, which are targeted for demand regulating control reducing consumption of the resource. A control unit executes the demand regulating control on the basis of a control instruction; and an input unit receives a first operation by the consumer, and transmits first request information requesting a change in the priorities of the plurality of control-target devices, to the operation unit in accordance with the first operation. The operation unit, upon receiving the first request information, specifies the plurality of control-target devices, and changes the priorities of the plurality of control-target devices in the priority information.

20 Claims, 7 Drawing Sheets

(52) U.S. Cl.
CPC ....... *Y02B 70/3225* (2013.01); *Y02B 70/3266* (2013.01); *Y04S 20/222* (2013.01); *Y04S 20/242* (2013.01)

(58) Field of Classification Search
USPC .......................................................... 700/295
See application file for complete search history.

(56) References Cited

U.S. PATENT DOCUMENTS

| | | |
|---|---|---|
| 2011/0282505 A1 | 11/2011 | Tomita et al. |
| 2011/0298286 A1 | 12/2011 | Batzler et al. |
| 2012/0330477 A1 | 12/2012 | Imahara et al. |
| 2013/0054040 A1 | 2/2013 | Takahashi et al. |
| 2013/0289785 A1 | 10/2013 | Takahashi et al. |

FOREIGN PATENT DOCUMENTS

| | | | |
|---|---|---|---|
| JP | 2010-166636 | A | 7/2010 |
| JP | 2011-036084 | A | 2/2011 |
| JP | 2012-055078 | A | 3/2012 |
| JP | 2012-151992 | A | 8/2012 |
| JP | 2013-31355 | A | 2/2013 |
| JP | 2013-046451 | A | 3/2013 |

OTHER PUBLICATIONS

Japanese Office Action received in corresponding Japanese Application No. 2013-108348 dated Oct. 11, 2016.

\* cited by examiner

| No | Consumer ID | Device ID | Power consumption | Day of week | Time period | Priority |
|----|-------------|-----------|-------------------|-------------|-------------|----------|
| 1  | 0001        | 001       | 2 kW              | Mon         | 10:00-11:00 | 5        |
| 2  | 0001        | 002       | 6 kW              | Mon         | 10:00-11:00 | 3        |
| 3  | 0001        | 003       | 4 kW              | Mon         | 10:00-11:00 | 1        |
|    |             |           |                   |             |             |          |

Fig. 3
0106
| No | Date | Day of week | Time period |
|---|---|---|---|
| 1 | 2012/08/06 | Mon | 10:00-11:00 |
| 2 | 2012/08/06 | Mon | 10:00-11:00 |
| 3 | 2012/08/06 | Mon | 10:00-11:00 |
|  |  |  |  |
|  |  |  |  |
Columns: 0301, 0302, 0303, 0304
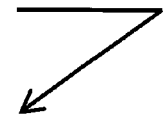
| Consumer ID | Device ID | Control content |
|---|---|---|
| 0001 | 001 | OFF |
| 0002 | 001 | OFF |
| 0003 | 001 | OFF |
|  |  |  |
Columns: 0305, 0306, 0307
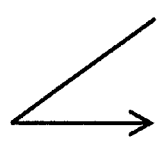

Fig. 6

Request information

| No (0501) | Date (0502) | Day of week (0503) | Time period (0504) |
|---|---|---|---|
| 1 | 2012/08/06 | Mon | 10:00-11:00 |

| Consumer ID (0505) | Device ID (0506) | Request type (0507) |
|---|---|---|
| 0001 | | 1 |

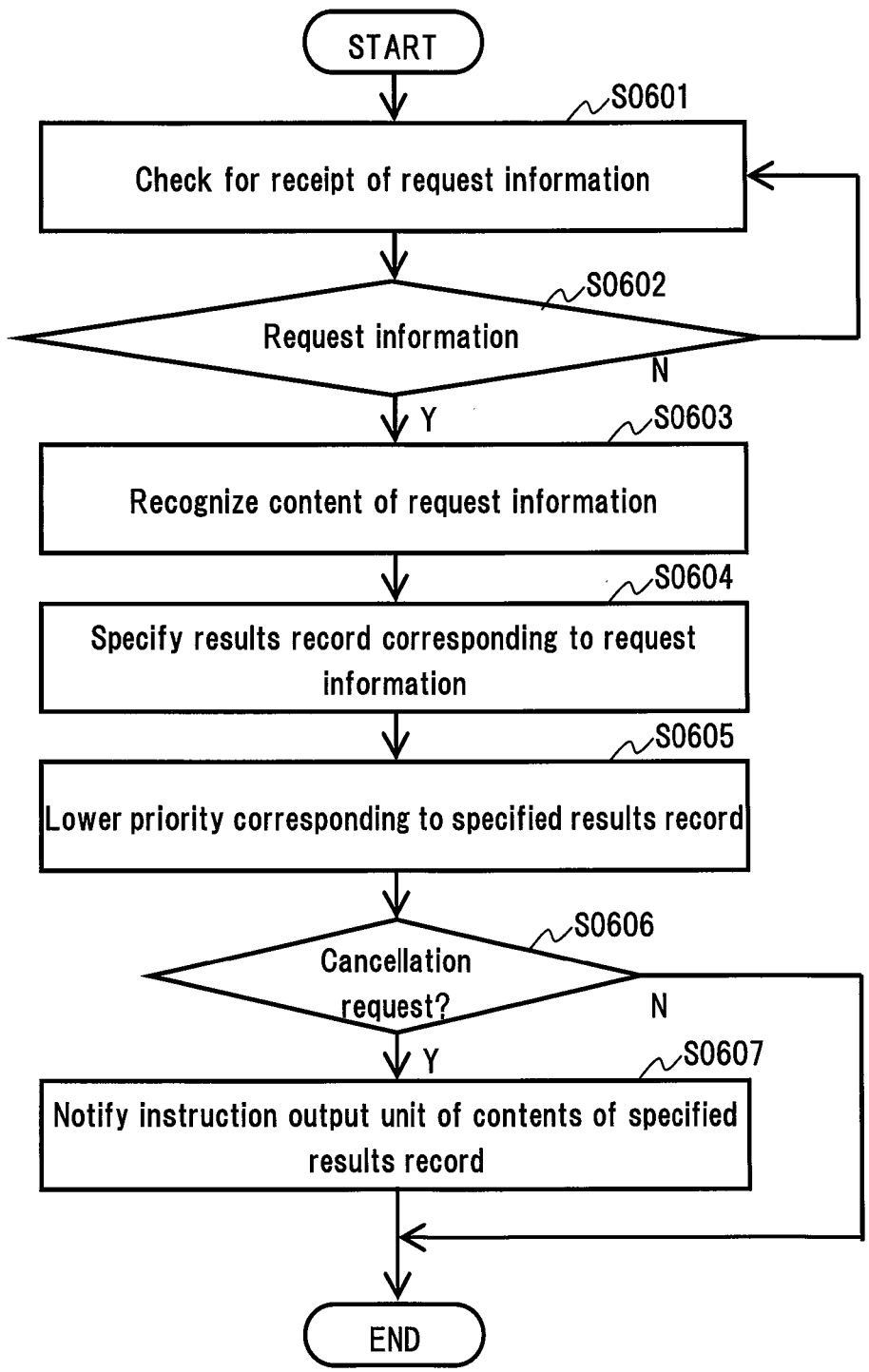

DEMAND REGULATING SYSTEM, DEMAND REGULATING APPARATUS, AND CONSUMPTION DEVICE MANAGEMENT APPARATUS

BACKGROUND OF THE INVENTION

Field of the Invention

The present invention relates to technology for regulating demand for a resource.

Description of the Related Art

Demand side management (DSM) for managing electric power demand is known. For example, Patent Literature 1 discloses the technology in which, in demand side equipment having a plurality of loads, when the electric power demand of operating loads exceeds available electric power, the operating loads are selected and interrupted in order starting with the lowest-priority load until the electric power demand for the loads drops below the available electric power, and, in addition, the interrupted loads are selected and recovered in order starting from the highest-priority load such that the electric power demand from the loads does not exceed the available electric power.

PTL 1

Japanese Patent Application Laid-open No. 2008-125295

When the priority order of a plurality of devices in the demand side equipment becomes inappropriate, the consumer must change the priority order by specifying each of the plurality of devices, thereby increasing the load on the consumer.

SUMMARY OF THE INVENTION

To solve for the above-described problem, a demand regulating system, which is one aspect of the present invention, includes: a storage unit that stores priority information indicating the priority of each of a plurality of consumption devices that consume a resource supplied from a supply facility; an operation unit that receives measurement information indicating a measurement result for consumption of the resource by the plurality of consumption devices, calculating a regulating quantity of demand for the resource on the basis of the measurement information, selecting from among the plurality of consumption devices on the basis of the priority information and the regulating quantity a plurality of control-target devices, which are targeted for demand regulating control reducing consumption of the resource, transmitting a first control instruction instructing the demand regulating control to demand side equipment that includes the plurality of control-target devices, and storing results information indicating the first control instruction in the storage unit; a control unit that is provided in the demand side equipment and executes demand regulating control on the basis of the first control instruction; and an input unit that is provided in the demand side equipment, receives a first operation by the consumer, and transmits first request information requesting a change in the priorities of the plurality of control-target devices, to the operation unit in accordance with the first operation, wherein the operation unit, upon having received the first request information, specifies the plurality of control-target devices on the basis of the results information and the first request information, and changes the priorities of the plurality of control-target devices in the priority information.

According to the aspect of the present invention, the consumer is able to easily change the priority of demand-regulating-control of the device using a simple operation.

BRIEF DESCRIPTION OF THE DRAWINGS

FIG. 2 illustrates an example of a priority database 0104;

FIG. 3 illustrates an example of a results database 0106;

FIG. 6 is an example of request information; and

FIG. 7 illustrates a priority change process.

DESCRIPTION OF THE PREFERRED EMBODIMENT

An embodiment of the present invention will be explained below by using the drawings.

Figure 1:
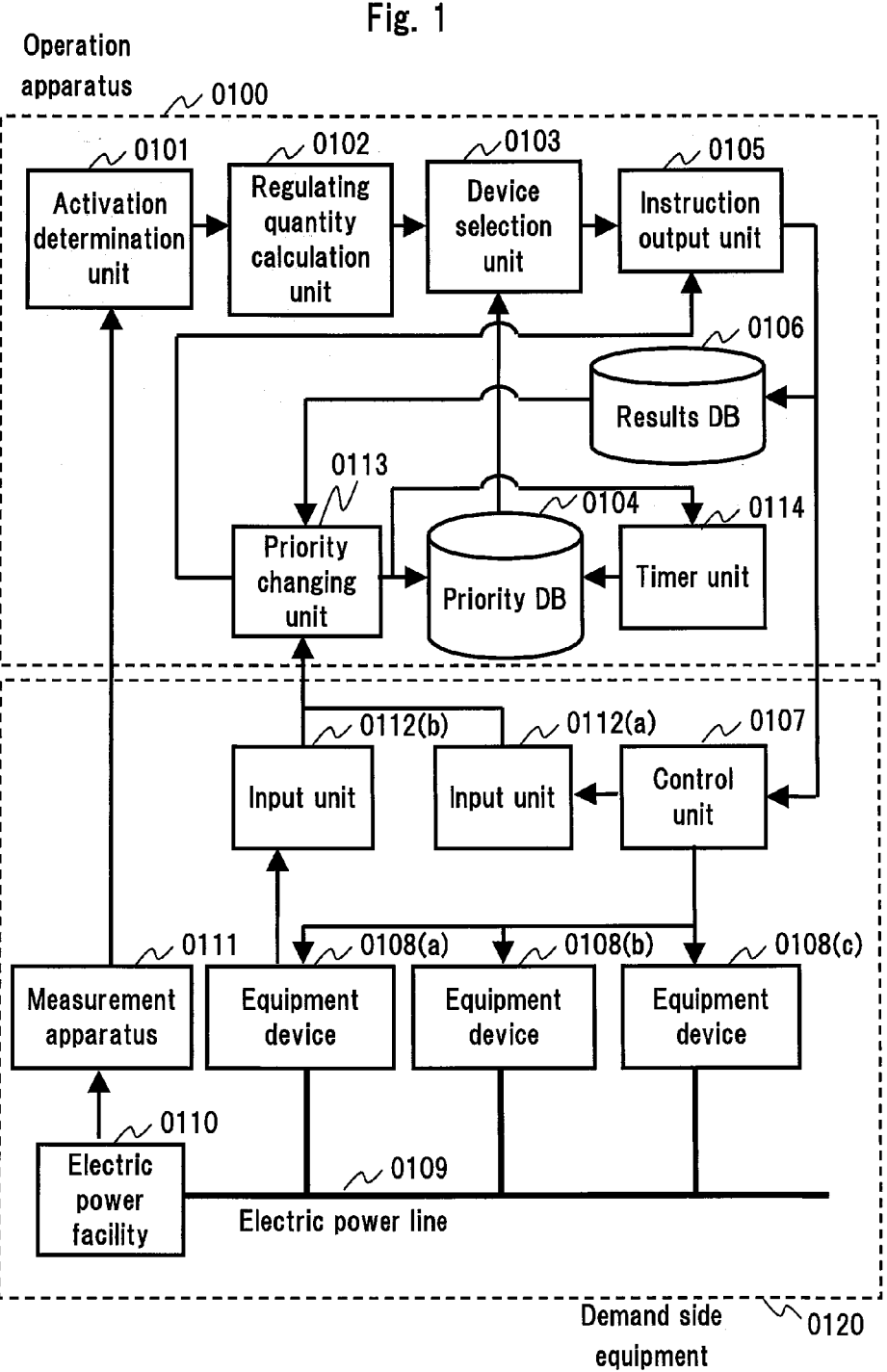
FIG. 1 illustrates the configuration of an electric demand regulating system of an embodiment of the present invention.

FIG. 1 shows the configuration of an electric demand regulating system of an embodiment of the present invention.

In this embodiment, an electric demand regulation system that applies the present invention will be explained. The present invention may be applied to a system for regulating demand for not only electric power, but also gas, water and other such resources supplied from a supply facility to demand side equipment. The electric demand regulating system of this embodiment includes an operation apparatus 0100 and demand side equipment 0120.

The operation apparatus 0100, for example, is realized using a computer. The computer, for example, includes a central processing unit (CPU), a memory, a bus, and a hard disk. A program executed by the CPU may be stored in a computer-readable medium and installed in the computer from the medium. The operation apparatus 0100 includes an activation determination unit 0101, a regulating quantity calculation unit 0102, a device selection unit 0103, a priority database 0104, an instruction output unit 0105, a results database 0106, and a timer unit 0114. The operation apparatus 0100 is not limited to a single computer, and may be a plurality of computers. Each part of the operation apparatus 0100 may be provided in any of the plurality of computers at this time.

The demand side equipment 0120 is a facility owned by the consumer. The demand side equipment 0120 includes a control unit 0107, an input unit 0112, an equipment device 0108, an electric power line 0109, an electric power facility 0110, and a measurement apparatus 0111. The demand side equipment 0120 is a home, a building, a factory, a region, and so forth.

Each of the equipment devices 0108(a), 0108(b), and 0108(c) are an electric water heater, an air conditioner, and other such electrical appliances in an ordinary home, a package air conditioner in an office building, machine tools in a factory, and other such device that operates on electric power. In the following explanation, when there is no need to distinguish between elements by using a letter of the alphabet following a numeral as in the equipment devices 0108(a), 0108(b), and 0108(c), the letter of the alphabet will be omitted. The equipment device 0108 operates by receiving electric power from the electric power line 0109. In this embodiment, an example in which three equipment devices 0108 exist is described, but the number of units is not limited to three. Furthermore, when the present invention is applied to a demand regulating system for another resource, the equipment device 0108 is device that operates using the other resource.

The electric power line 0109 is for supplying electric power to the equipment device 0108, and, for example, corresponds to all facilities for delivering electric power, such as the distribution lines of an electric power system, the electrical wiring inside a home, the electrical wiring inside a building, and the electrical wiring inside a factory. When the present invention is applied to a demand regulating system for another resource, a delivery facility for delivering the resource is used in place of the electric power line 0109.

The electric power facility 0110, for example, is a facility that is incidental to the electric power line 0109, such as a distribution substation of an electric power system, a home panel board, a building panel board, or a factory panel board. The electric power facility 0110 is connected to the electric power system, and is supplied with electric power from the electric power system. When the present invention is applied to a demand regulating system for another resource, the facility is incidental to the delivery facility. Furthermore, a plurality of pieces of demand side equipment 0120 may be connected to a single electric power facility 0110 via the electric power line 0109.

The measurement apparatus 0111 is connected to the operation apparatus 0100 via a network. The network, for example, is an automatic metering network. The measurement apparatus 0111 measures the size of an electric load by the electric power facility 0110, and transmits a measurement result (measurement information) to the operation apparatus 0100. The measurement apparatus 0111, for example, is a wattmeter. When the present invention is applied to a demand regulating system for another resource, the measurement apparatus 0111 is a facility for measuring a value related to usage, such as the flow rate or pressure of the resource.

Each part of the operation apparatus 0100 will be explained in detail hereinafter.

The activation determination unit 0101 receives a measurement value of the measurement apparatus 0111 via the network, and determines whether or not to suppress the electric demand of the electric power facility 0110. In the determination, the activation determination unit 0101, for example, compares the measurement value from the measurement apparatus 0111 to a predetermined measurement threshold. Then, when the measurement value exceeds the measurement threshold, the activation determination unit 0101 outputs to the regulating quantity calculation unit 0102 the measurement value and identification information of the measurement apparatus 0111, day-of-week information indicating the current day of the week, and time information indicating the current time.

The regulating quantity calculation unit 0102 acquires the measurement value and identification information of the measurement apparatus 0111, the day-of-week information, and the time information from the activation determination unit 0101. The regulating quantity calculation unit 0102 stores a preconfigured facility capacity of the electric power facility 0110. The facility capacity of the electric power facility 0110 may be stored in an external storage apparatus. The regulating quantity calculation unit 0102 calculates an electric demand regulating quantity based on the measurement value of the measurement apparatus 0111 and the facility capacity value of the electric power facility 0110. For example, the regulating quantity calculation unit 0102 calculates the difference between the measurement value of the measurement apparatus 0111 and the facility capacity value of the electric power facility 0110 as the electric demand regulating quantity. Then, the regulating quantity calculation unit 0102 outputs the electric demand regulating quantity, the day-of-week information, and the time information acquired from the activation determination unit 0101 to the device selection unit 0103.

The device selection unit 0103 acquires the electric demand regulating quantity, the day-of-week information, and the time information from the regulating quantity calculation unit 0102. Then, the device selection unit 0103 selects an equipment device 0108 to become the target for a setting change based on the electric demand regulating quantity and the priority database 0104.

FIG. 2 shows an example of the priority database 0104.

The priority database 0104 includes as items a number 0201, a consumer ID 0202, a device ID 0203, power consumption 0204, a day-of-week 0205, a time period 0206, and a priority 0207. The number 0201 is the number of a priority setting record, and is serial numbers starting from 1. The consumer ID 0202 is a number assigned to a consumer that is to become the target of the priority setting, and is a unique number in the electric demand regulating system. The device ID 0203 is a number assigned to an equipment device 0108 that is to become the target of the priority setting, and is a unique number in the demand side equipment 0120. That is, the equipment device 0108 is specified using a combination of the consumer ID 0202 and the device ID 0203. The power consumption 0204 is a representative value of power consumption (kW) of the target equipment device 0108 specified by the consumer ID 0202 and the device ID 0203. The day-of-week 0205 is the day of the week targeted for the priority setting, and indicates any of Monday, Tuesday, Wednesday, Thursday, Friday, Saturday, or Sunday. The day-of-week 0205 may be another mode, such as weekday or holiday. The time period 0206 is the time period targeted for the priority setting, and includes a duration calibrated in one hour intervals. The time period 0206 may include another duration, such as 30 minute intervals. That is, the power consumption 0204 indicates the typical power consumption of an equipment device 0108 specified using a combination of the consumer ID 0202 and the device ID 0203 for a time specified using a combination of the day-of-week 0205 and the time period 0206.

The priority 0207 is used when the device selection unit 0103 selects an equipment device 0108 for which power consumption is to be reduced in order to alleviate an electric power facility 0110 overload state. The priority 0207 can be configured by the consumer on the basis of the impact on the comfortability when the power consumption of the equipment device 0108 has been controlled by the operation apparatus 0100. For example, when the impact on the comfortability is small even though the equipment device 0108 is being controlled by the operation apparatus 0100, the priority 0207 is configured to a higher value, and when the impact on the comfortability is great, the priority 0207 is configured to a smaller value. The priority 0207 in this embodiment is indicated in five stages (5, 4, 3, 2, 1). An equipment device 0108 is selected on a priority basis the larger the value of the priority 0207 is for the equipment device 0108. The priority is not necessarily limited to five stages.

The device selection unit 0103 extracts from the priority database 0104 records that match the day-of-week information and the time information acquired from the regulating quantity calculation unit 0102. Then, the device selection unit 0103 sorts the extracted records in descending order from the highest priority 0207 value. Then, the device selection unit 0103 calculates a power consumption sum by adding the power consumption 0204 of the records in the order in which the records were sorted, selects records up to the record for which the power consumption sum initially exceeds the size of the electric demand regulating quantity, and stores the consumer ID 0202 and the device ID 0203 recorded in the selected records. Then, the device selection unit 0103 outputs the stored consumer IDs and the device IDs to the instruction output unit 0105.

The instruction output unit 0105 specifies an equipment device 0108 using the consumer ID and the device ID acquired from the device selection unit 0103, creates a control instruction for the equipment device 0108, and outputs the control instruction to the control unit 0107. Then, the instruction output unit 0105 records the contents of the control instruction outputted to the control unit 0107 in the results database 0106.

FIG. 3 shows an example of the results database 0106.

The results database 0106 has as items a number 0301, a date 0302, a day-of-week 0303, a time period 0304, a consumer ID 0305, a device ID 0306, and control content 0307. The number 0301 is the number of a control instruction results record, and is serial numbers starting from 1. The date 0302, the day-of-week 0303, and the time period 0304 respectively store the date, the day of the week, and time period of the control instruction outputted to the control unit 0107 by the instruction output unit 0105. The consumer ID 0305 and the device ID 0306 are values for specifying an equipment device 0108 targeted for control by the control instruction. The control content 0307 is the control content of the control instruction, and stop (OFF) is recorded here as an example. The control content 0307 may be other content for reducing the power consumption of the control-target equipment device 0108. For example, when the control-target equipment device 0108 is an air conditioner, the control content 0307 may be a temperature setting for either raising the cooling temperature or lowering the heating temperature. Also when the control-target equipment device 0108 is a lighting device, the control content 0307 may indicate a luminous intensity for lowering the degree of brightness. The results database 0106 is recorded in the order in which records for each control instruction outputted by the instruction output unit 0105 to the control unit 0107 are outputted for these items.

Each part of the demand side equipment 0120 will be explained here.

The control unit 0107 is connected to the instruction output unit 0105 via a network, and receives a control instruction from the instruction output unit 0105. This network, for example, is the Internet. The control unit 0107 stores in advance information linking a combination of a consumer ID and a device ID with an equipment device 0108. The control unit 0107 specifies a control-target equipment device 0108 using the consumer ID and device ID combination specified by the control instruction and the linking information. Then the control unit 0107 controls the control-target equipment device 0108 in accordance with the control content specified by the control instruction. For example, when the control content is stop (OFF), the control unit 0107 stops (turns OFF) the control-target equipment device 0108.

In accordance with the processing of the control unit 0107, the power consumption of the equipment device 0108 is reduced, the amount of power transmitted over the electric power line 0109 is reduced, and the load placed on the electric power facility 0110 is alleviated. Also, the operation apparatus 0100 prioritizes control beginning with equipment device 0108 having the highest priority, thereby reducing the impact on the comfortability provided to the consumer.

However, the size of the impact on the comfortablility experienced by the consumer in accordance with controlling the equipment device 0108 will vary greatly in accordance with the time and situation in which the consumer has been placed, and there may be cases in which the priority value recorded in the priority database 0104 does not conform with the actual circumstances. In such a case, the input unit 0112 described hereinbelow can change the control with respect to the equipment device 0108.

The input unit 0112 is an input terminal for the consumer to update the priority value recorded in the priority database 0104 in a case where the comfortablility of the consumer is being impaired by the control of the equipment device 0108. The input unit 0112, upon receiving an input operation by the consumer, transmits request information based on the input operation to a priority changing unit 0113 via a network. A plurality of input units 0112 may be provided for a single piece of demand side equipment 0120. In this embodiment, an input unit 0112(a), which is one of the plurality of input units 0112 in a single piece of demand side equipment 0120, is regarded as a master unit, and another input unit 0112(b) is regarded as a slave unit. The input unit 0112(a) alone may be provided in a single piece of demand side equipment 0120.

In this embodiment, the input unit 0112(a) is provided together with the control unit 0107, and the input unit 0112(b) is provided together with an equipment device 0108(a). The input unit 0112(a) may be included in the control unit 0107, and the input unit 0112(b) may be included in the equipment device 0108(a). The control unit 0107 and the input unit 0112(a) may be realized in accordance with an energy management system, such as a home energy management system (HEMS) or a factory energy management system (FEMS). The input unit 0112(b) may perform an input to the equipment device 0108(a) and may display the status of the equipment device 0108(a).

Figure 4:
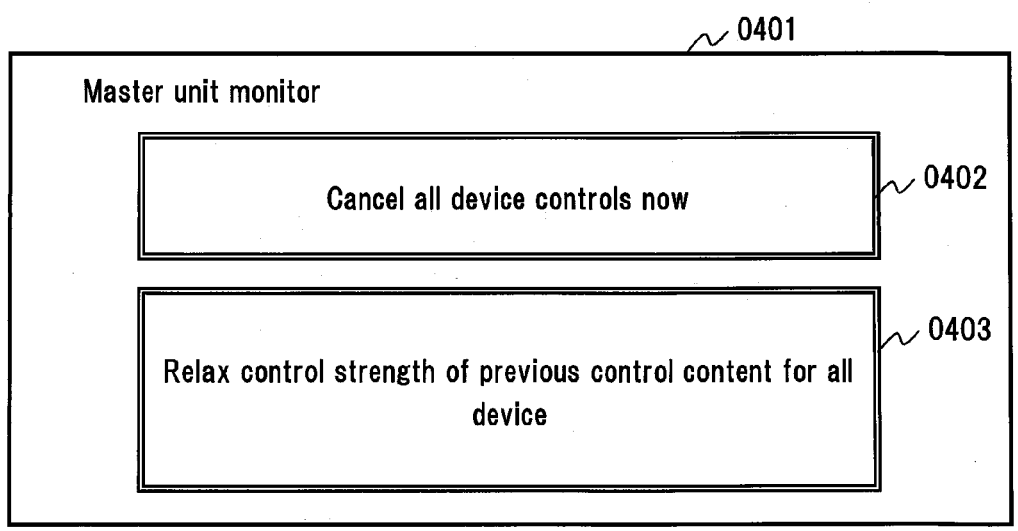
FIG. 4 illustrates an example of a display by a master unit.

FIG. 4 shows an example of a display by the master unit.

The input unit 0112 of this embodiment includes a touch panel for input and display. The input unit 0112 may include a human machine interface (HMI) other than a touch panel, such as a keyboard and display. The input unit 0112(a) displays a master unit monitoring screen 0401. The master unit monitoring screen 0401 includes a cancel all controls button 0402 and a change all priorities button 0403. The cancel all controls button 0402 indicates that the cancellation of all controls being executed with respect to the equipment device 0108 in the demand side equipment 0120 is accepted for the equipment device 0108 of the consumer, and is touched by the consumer to effect the cancellation. For example, when the input unit 0112(a) transmits to the operation apparatus 0100 request information (second request information) in accordance with the touching (second operation) of the cancel all controls button 0402 by the consumer, the operation apparatus 0100 suspends all controls that are being executed with respect to the equipment device 0108 in the demand side equipment 0120. A control change process included in this processing will be explained below. This makes it possible to cancel all controls for the equipment device 0108 in the demand side equipment 0120. The change all priorities button 0403 indicates that the reducing of the priorities of the equipment device 0108 in the demand side equipment 0120 is accepted in the selection of a control target in the subsequent electric demand regulating control by the operation apparatus 0100, and is touched by the consumer to effect the change. For example, when the input unit 0112(a) transmits to the operation apparatus 0100 request information (first request information) in accordance with the touching (first operation) of the change all priorities button 0403 by the consumer, the operation apparatus 0100 reduces the priorities of all the equipment device 0108 that was targeted for control in the previous electric demand regulating control in the demand side equipment 0120. A control change process included in this processing will be explained below. This makes it difficult for all of the control-targetable equipment device 0108 in the demand side equipment 0120 to be selected as control targets in the subsequent electric demand regulating control by the operation apparatus 0100.

The input unit 0112(a) displays the change all priorities button 0403 in the master unit monitoring screen 0401 at all times, and receives the input of the change all priorities button 0403. The control unit 0107 notifies the input unit 0112(a) of the execution of the electric demand regulating control. The input unit 0112(a) displays the cancel all controls button 0402 on the master unit monitoring screen 0401 during the execution of electric demand regulating control, and receives the input of the cancel all controls button 0402. The input unit 0112(a) may display the change all priorities button 0403 in the master unit monitoring screen 0401 from the start of electric demand regulating control until a fixed period of time has elapsed following the end of the electric demand regulating control.

Figure 5:
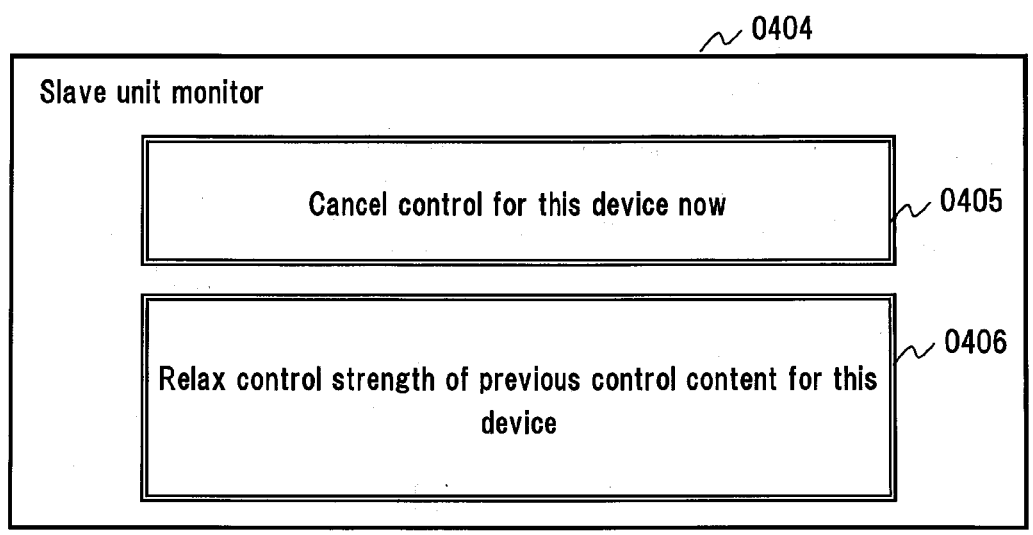
FIG. 5 illustrates an example of a display by a slave unit.

FIG. 5 shows an example of a display by the slave unit.

A case in which the input unit 0112(b) is incorporated in a washing machine will be explained here. The input unit 0112(b) displays a slave unit monitoring screen 0404. The slave unit monitoring screen 0404 includes a cancel individual control button 0405 and a change individual priority button 0406. The cancel individual control button 0405 indicates that the cancellation of a control that is being executed with respect to the equipment device 0108 is accepted, and is touched by the consumer to cancel the control. For example, when the washing machine is stopped by an electric demand regulating control and the input unit 0112(b) transmits to the operation apparatus 0100 request information (fourth request information) in accordance with the touching (fourth operation) of the cancel individual control button 0405 by the consumer, the operation apparatus 0100 cancels the stop control to the washing machine. A control change process included in this processing will be explained below. This makes it possible for the washing machine to resume washing machine functions. The change individual priority button 0406 indicates that the reducing of the priority of the equipment device 0108 is accepted in the selection of a control target in the subsequent electric demand regulating control by the operation apparatus 0100, and is touched by the consumer to effect the change. For example, when the input unit 0112(b) transmits to the operation apparatus 0100 request information (third request information) in accordance with the touching (third operation) of the change individual priority button 0406 by the consumer either when the washing machine has been stopped by the electric demand regulating control or the electric demand regulating control has ended, the operation apparatus 0100 reduces the priority of the equipment device 0108 that was targeted for control in the previous electric demand regulating control. A control change process included in this processing will be explained below. This makes it difficult for the washing machine to be selected as a control target in the subsequent electric demand regulating control by the operation apparatus 0100.

The input unit 0112(b) displays the change individual priority button 0406 on the slave unit monitoring screen 0404 at all times, and receives the input of the change individual priority button 0406. The equipment device 0108 (a) notifies the input unit 0112(b) of the execution of the electric demand regulating control for the equipment device 0108(a). The input unit 0112(b) displays the cancel individual control button 0405 on the slave unit monitoring screen 0404 during the execution of an electric demand regulating control, and receives the input of the cancel individual control button 0405. The input unit 0112(b) may display the change individual priority button 0406 on the slave unit monitoring screen 0404 from the start of electric demand regulating control in the equipment device 0108(a) until a fixed period of time has elapsed following the end of the electric demand regulating control.

According to the input unit 0112, it is possible to transmit at any time in accordance with a consumer operation a request for reducing the priority for an equipment device 0108 that has become the target of control of the latest electric demand regulating control. In addition, it is possible to transmit, in accordance with a consumer operation, a request for cancelling a running electric demand regulating control while the electric demand regulating control is being executed. In accordance with the consumer operating the input unit 0112(a), it is possible to transmit requests for a plurality of equipment devices 0108 that are being targeted for control by an electric demand regulating control, and in accordance with operating the input unit 0112(b), it is possible to transmit a request with respect to an equipment device 0108 corresponding to the input unit 0112(b).

FIG. 6 is an example of request information.

The request information includes as items a number 0501, a date 0502, a day-of-week 0503, a time period 0504, a consumer ID 0505, a device ID 0506, and a request type 0507. The number 0501 is the number of records in the request information, and is serial numbers starting from 1. The date 0502, the day-of-week 0503, and the time period 0504 are the time at which the input unit 0112 received an input by the consumer. The consumer ID 0505 is the ID of the consumer for the demand side equipment 0120 in which the input unit 0112 is installed.

The device ID 0506 is the ID of the equipment device 0108 that is the target of a request to cancel a running control or change a priority. When the request target is a plurality of equipment devices 0108 in the demand side equipment 0120 such as all of the equipment device 0108 for which controls are being executed, or all control-targetable equipment device 0108, the device ID 0506 is blank. That is, it is a case in which the consumer has touched a button in the master unit monitoring screen 0401.

The request type 0507 is a value indicating the function of the button that was selected by the consumer on the input unit 0112. In this embodiment, in the case of a cancel request for cancelling a control that is being executed on the equipment device 0108, the value of the request type 0507 is "1". In the case of a priority change request for changing a priority in a control-target selection for a next electric demand regulating control, the value of the request type 0507 is "2". That is, in request information in a case where the cancel all controls button 0402 has been touched, the device ID 0506 is blank and the value of the request type 0507 is 1. In request information in a case where the change all priorities button 0403 has been touched, the device ID 0506 is blank and the value of the request type 0507 is 2. In request information in a case where the cancel individual control button 0405 has been touched, the device ID 0506 is set and the value of the request type 0507 is 1. In request information in a case where the change individual priority button 0406 has been touched, the device ID 0506 is set and the value of the request type 0507 is 2.

The request information need not include any items. For example, the request information may include only the consumer ID.

The priority changing unit 0113 in the operation apparatus 0100 will be explained here.

The priority changing unit 0113 specifies a record in the priority database 0104 corresponding to the request information from the demand side equipment 0120, and reduces the priority 0207 of the record. A priority change process by the priority changing unit 0113 will be explained hereinbelow.

FIG. 7 shows a priority change process.

The priority changing unit 0113 repeatedly executes a priority change process.

In S0601, the priority changing unit 0113 checks for the receipt of request information from the input unit 0112.

In S0602, the priority changing unit 0113 determines whether or not request information has been received. When it is determined that request information has not been received, the priority changing unit 0113 returns the processing to S0601. Alternatively, when it is determined that request information has been received, the priority changing unit 0113 advances the processing to S0603.

In S0603, the priority changing unit 0113 recognizes the contents of the received request information. That is, the priority changing unit 0113 recognizes the contents of the date 0502, the day-of-week 0503, the time period 0504, the consumer ID 0505, the device ID 0506, and the request type 0507 in the received request information.

In S0604, the priority changing unit 0113 specifies a record of the results database 0106 corresponding to the received request information as the results record. At this point, the priority changing unit 0113 collates the items specified in the recognized request information with items specified in the results database 0106. For example, when the request information indicates the input of the cancel all controls button 0402, the priority changing unit 0113 specifies as the results record all of the records in which the date 0302, the day-of-week 0303, the time period 0304, and the consumer ID 0305 of the record in the results database 0106 match the contents of the request information. When the request information indicates the input of the change all priorities button 0403, the priority changing unit 0113 extracts all records in which the consumer ID 0305 of the record in the results database 0106 matches the contents of the request information, and specifies the record with the most recent date 0302 among the extracted records as the results record. In this case, the priority changing unit 0113 may extract all records in which the day-of-week 0303, the time period 0304, and the consumer ID 0305 of the record in the results database 0106 match the contents of the request information, and may specify as the results record the record having the most recent date 0302 from among the extracted records. When the request information indicates the input of the cancel individual control button 0405, the priority changing unit 0113 specifies as the results record all records in which the date 0302, the day-of-week 0303, the time period 0304, the consumer ID 0305, and the device ID 0306 from the results database 0106 match the contents of the request information. When the request information indicates the input of the change individual priority button 0406, the priority changing unit 0113 extracts all records in which the consumer ID 0305 and the device ID 0306 from the results database 0106 match the contents of the request information, and specifies as the results record the record having the most recent date 0302 from among the extracted records. In this case, the priority changing unit 0113 may extract all records in which the day-of-week 0303, the time period 0304, the consumer ID 0305, and the device ID 0306 from the results database 0106 match the contents of the request information, and may specify as the results record the record having the most recent date 0302 from among the extracted records.

In S0605, the priority changing unit 0113 specifies a record in which the consumer ID 0202, the device ID 0203, the day-of-week 0205, and the time period 0206 from within the priority database 0104 match the consumer ID 0305, the device ID 0306, the day-of-week 0303, and the time period 0304 of the results record. Thereafter, the priority changing unit 0113 reduces the priority 0207 of the specified priority database 0104 record. For example, the priority changing unit 0113 changes the priority 0207 of the specified priority database 0104 record to 1. The priority changing unit 0113 may subtract a prescribed value, within a range of priority values, from the priority 0207 of the specified priority database 0104 record.

In S0606, the priority changing unit 0113 determines whether or not the received request information indicates a cancellation request. That is, when the request information indicates the input of either the cancel all controls button 0402 or the cancel individual control button 0405, the priority changing unit 0113 determines that the request information indicates a cancellation request (S0606: Y), and advances the processing to S0607. Alternatively, when the request information indicates the input of either the change all priorities button 0403 or the change individual priority button 0406, the priority changing unit 0113 determines that the request information does not indicate a cancellation request (S0606: N), and ends the flow.

In S0607, the priority changing unit 0113 notifies the instruction output unit 0105 of the information in the date 0302, the day-of-week 0303, the time period 0304, the consumer ID 0305, the device ID 0306, and the control content 0307 of the results records, and ends the flow. At this time, the instruction output unit 0105 specifies an equipment device 0108 using the consumer ID and the device ID from the priority changing unit 0113, and transmits a control instruction for cancelling the control for the specified equipment device 0108 to the control unit 0107 via the network. The control unit 0107, upon receiving the control instruction, cancels the control for the equipment device 0108.

The preceding is the priority change process. In the priority change process, instead of executing S0605 after S0604, the priority changing unit 0113 may execute the processing of S0605 when it has been determined that S0606 is negative (S0606: N). The priority changing unit 0113 may determine that the request information indicates a cancellation request when the received request information includes a consumer ID, and demand regulation control is being executed with respect to the consumer.

The priority changing unit 0113 is able to specify the priority of the control-target equipment device 0108 by virtue of the fact that the priority database 0104 stores in an associated manner a consumer ID, a device ID, and a priority, the results database 0106 stores the consumer ID and the device ID of a control target, and the request information includes the consumer ID. The priority changing unit 0113 is able to specify the priority of a time period in a control instruction for the control-target equipment device 0108 by virtue of the fact that the priority database 0104 stores in an associated manner a demand-side ID, a device ID, and a time period, and the results database 0106 stores in an associated manner the time period of the control instruction and the consumer ID and the device ID of the control target. The priority changing unit 0113, by selecting the latest control instruction of a control target from among the control instructions stored in the results database 0106, is able to reduce the priority for the timer period of the latest control instruction using a simple operation without the consumer specifying a time period.

According to the priority change process, it is possible to specify an equipment device 0108 in accordance with a consumer operation, and to reduce the priority of the specified equipment device 0108. When the consumer operation indicates a cancel request, it is possible to specify an equipment device 0108 in accordance with this operation, and to cancel the demand regulating control for the specified equipment device 0108.

The timer unit 0114 in the operation apparatus 0100 will be explained here.

The timer unit 0114, when the priority 0207 of the priority database 0104 has been reduced, either increases the value of the priority after a fixed period of time has elapsed and returns the priority to the original value, or brings the priority closer to the original value by a prescribed number. The timer unit 0114 makes it possible to prevent the priority from remaining reduced. It is possible to make the priority value correspond to changes in the lifestyle of the consumer.

According to this embodiment, when the consumer feels uncomfortable due to an electric demand regulating control, it is possible to change the priorities of a plurality of equipment devices 0108 in the demand side equipment 0120 with a one-time operation, and to reduce the labor of changing a priority for the consumer.

The present invention is not limited to the embodiment described above, and includes many variations. The above-described embodiment was explained in detail in order to illustrate the present invention in an easy-to-understand manner, and the present invention is not necessarily limited to an embodiment that includes all of the configurations explained.

The technique explained above using the example can also be expressed as follows.

(Wording 1)

A demand regulating system, comprising:

a storage unit that stores priority information indicating a priority of each of a plurality of consumption devices that consume a resource supplied from a supply facility;

an operation unit that receives measurement information indicating a measurement result for consumption of the resource by the plurality of consumption devices, calculating a regulating quantity of demand for the resource on the basis of the measurement information, selecting from among the plurality of consumption devices on the basis of the priority information and the regulating quantity a plurality of control-target devices, which are targeted for demand regulating control reducing consumption of the resource, transmitting a first control instruction instructing the demand regulating control to demand side equipment that includes the plurality of control-target devices, and storing results information indicating the first control instruction in the storage unit;

a control unit that is provided in the demand side equipment, receives the first control instruction, and executes the demand regulating control on the basis of the first control instruction; and an input unit that is provided in the demand side equipment, receives a first operation by a consumer, and transmits first request information requesting a change in the priority of each of the plurality of control-target devices, to the operation unit in accordance with the first operation, wherein the operation unit, upon receiving the first request information, specifies the plurality of control-target devices on the basis of the results information and the first request information, and changes the priority of each of the plurality of control-target devices in the priority information.

(Wording 2)

A demand regulating system according to wording 1, wherein the operation unit selects the plurality of control-target devices from among the plurality of consumption devices in descending order of the priority, and upon receiving the first request information, reduces the priority of each of the plurality of control-target devices in the priority information.

(Wording 3)

A demand regulating system according to wording 2, wherein the input unit receives a second operation by the consumer, and transmits second request information requesting cancellation of the demand regulating control, to the operation unit in accordance with the second operation, the operation unit, upon receiving the second request information, specifies the plurality of control-target devices on the basis of the results information and the second request information, and transmits a second control instruction indicating cancellation of the demand regulating control to the control unit, and the control unit receives the second control instruction, and cancels the demand regulating control on the basis of the second control instruction.

(Wording 4)

A demand regulating system according to wording 3, wherein the input unit displays the fact that the first operation is received, and transmits the first request information to the operation unit in accordance with the first operation, the control unit notifies the input unit of the execution of the demand regulating control, and while the demand regulating control is being executed, the input unit displays the fact that the second operation is received, and transmits the second request information to the operation unit in accordance with the second operation.

(Wording 5)

A demand regulating system according to wording 4, wherein the operation unit increases the priority of each of the plurality of control-target devices in the priority information when a prescribed period of time has elapsed following the reducing of the priority of each of the plurality of control-target devices in the priority information.

(Wording 6)

A demand regulating system according to wording 5, wherein the priority information includes associations among identification information of the consumer, identification information of each of the plurality of control-target devices, and the priority of each of the plurality of control-target devices, the results information includes associations among the demand side equipment identification information, the identification information of the plurality of control-target devices, and the first control instruction, the first request information includes the consumer identification information, and the operation unit specifies the plurality of control-target devices on the basis of the results information and the first request information, and changes the priority of each of the plurality of control-target devices in the priority information.
(Wording 7)
A demand regulating system according to wording 6, wherein the priority information includes a priority for each time period,
the results information includes information indicating a time for the first control instruction, and
the operation unit specifies the plurality of control-target devices and the time period of the first control instruction on the basis of the results information and the first request information, and changes the priority of each of the plurality of control-target devices in the specified time period in the priority information.
(Wording 8)
A demand regulating system according to wording 7, wherein the operation unit specifies the consumer on the basis of the first request information, selects a latest control instruction for the consumer on the basis of the results information, recognizes a consumption device that is the target of the selected control instruction and the time period of the selected control instruction, and changes the priority of the recognized consumption device in the recognized time period in the priority information.
(Wording 9)
A demand regulating system according to wording 8, further comprising:
a specific device input unit that is provided in the demand side equipment and is associated beforehand with a specific device, which is one of the plurality of control-target devices, and receives a third operation by the consumer and transmits third request information requesting a change of the priority of the specific device to the operation unit in accordance with the third operation,
wherein the operation unit, upon receiving the third request information, specifies the specific device on the basis of the results information and the third request information, and changes the priority of the specific device in the priority information.
(Wording 10)
A demand regulating system according to wording 9, wherein the specific device input unit receives a fourth operation by the consumer, and transmits fourth request information requesting the cancellation of the demand regulating control for the specific device, to the operation unit in accordance with the fourth operation,
the operation unit, upon receiving the fourth request information, specifies the specific device on the basis of the results information and the fourth request information, and transmits, to the control unit, a third control instruction indicating the cancellation of the demand regulating control for the specific device, and
the control unit receives the third control instruction, and cancels the demand regulating control for the specific device on the basis of the third control instruction.
(Wording 11)
A demand regulating system according to any one of wordings 1 through 10, wherein the resource is electric power.
(Wording 12)
A demand regulating apparatus, comprising:
a storage unit that stores priority information indicating a priority of each of a plurality of consumption devices that consume a resource supplied from a supply facility; and
an operation unit that receives measurement information indicating a measurement result for consumption of the resource by the plurality of consumption devices, calculating a regulating quantity of demand for the resource on the basis of the measurement information, selecting from among the plurality of consumption devices on the basis of the priority information and the regulating quantity a plurality of control-target devices, which are targeted for demand regulating control reducing consumption of the resource, transmitting a first control instruction instructing the demand regulating control to demand side equipment that includes the plurality of control-target devices, and storing results information indicating the first control instruction in the storage unit,
wherein the operation unit, upon receiving from the demand side equipment first request information requesting a change of the priority of each of the plurality of control target devices, specifies the plurality of control-target devices on the basis of the results information and the first request information, and changes the priority of each of the plurality of control-target devices in the priority information.
(Wording 13)
A consumption device management apparatus comprising:
a control unit that stores priority information indicating a priority of each of a plurality of consumption devices that consume a resource supplied from a supply facility, receiving measurement information indicating consumption of the resource of the resource consumed by the plurality of consumption devices, calculating a regulating quantity of demand for the resource on the basis of the measurement information, selecting from among the plurality of consumption devices on the basis of the priority information and the regulating quantity a plurality of control-target devices, which are targeted for demand regulating control reducing consumption of the resource, transmitting a first control instruction instructing the demand regulating control to demand side equipment that includes the plurality of control-target devices, receiving the first control instruction from an operation apparatus that stores results information indicating the first control instruction, and executing the demand regulating control for the plurality of control-target devices on the basis of the first control instruction; and
an input unit that receives a first operation by a consumer, and transmitting first request information requesting a change in the priority of each of the plurality of control-target devices, to the operation apparatus in accordance with the first operation,
wherein the operation apparatus, upon receiving the first request information, specifies the plurality of control-target devices on the basis of the results information and the first request information, and changes the priority of each of the plurality of control-target devices in the priority information.

The terminology in the above wordings will be explained. The supply facility corresponds to the electric power system, the electric power facility 0110, and the electric power line 0109. The resource corresponds to electric power, gas, water, and so forth. The consumption device corresponds to the equipment device 0108. The storage unit corresponds to the priority database 0104 and the results database 0106. The priority information corresponds to the priority database 0104. The results information corresponds to the results database 0106. The operation unit corresponds to the activation determination unit 0101, the regulating quantity calculation unit 0102, the device selection unit 0103, the instruction output unit 0105, and the timer unit 0114. The input unit corresponds to the input unit 0112(*a*). The specific device input unit corresponds to the input unit 0112(*b*). The specific device corresponds to the equipment device 0108 (*a*). The consumer identification information corresponds to the consumer ID. The identification information of each of the plurality of control-target devices corresponds to the device ID. The demand regulating apparatus corresponds to the operation apparatus 0100. The consumption device management apparatus corresponds to the control unit 0107 and the input unit 0112(*a*).

What is claimed is:

1. A demand regulating system, comprising:
    a storage unit that stores priority information indicating a priority for each of a plurality of consumption devices that consume a resource supplied from a supply facility;
    an operation unit that receives measurement information indicating a measurement result for consumption of the resource by the plurality of consumption devices, calculating a regulating quantity of demand for the resource on the basis of the measurement information, selecting from among the plurality of consumption devices, on the basis of the priority information and the regulating quantity, a plurality of control-target devices, which are targeted for demand regulating control reducing consumption of the resource, transmitting a first control instruction instructing the demand regulating control to demand side equipment that includes the plurality of control-target devices, and storing result information indicating the first control instruction in the storage unit;
    a control unit that is provided in the demand side equipment, receives the first control instruction, and executes the demand regulating control on the basis of the first control instruction; and
    an input unit that is provided in the demand side equipment, receives a first operation by a consumer, and transmits first request information requesting a change in the priority of each of the plurality of control-target devices, to the operation unit in accordance with the first operation,
    wherein the operation unit, upon receiving the first request information, specifies the plurality of control-target devices on the basis of the result information and the first request information, and reduces the priority of each of the plurality of control-target devices in the priority information, and
    wherein the operation unit increases the priority of each of the plurality of control-target devices in the priority information when a prescribed period of time has elapsed following the reducing of the priority of each of the plurality of control-target devices in the priority information.

2. A demand regulating system according to claim 1, wherein the operation unit selects the plurality of control-target devices from among the plurality of consumption devices in descending order of the priority, and upon receiving the first request information, reduces the priority of each of the plurality of control-target devices in the priority information.

3. A demand regulating system according to claim 1, wherein the input unit receives a second operation by the consumer, and transmits second request information requesting cancellation of the demand regulating control, to the operation unit in accordance with the second operation,
    the operation unit, upon receiving the second request information, specifies the plurality of control-target devices on the basis of the results information and the second request information, and transmits a second control instruction indicating cancellation of the demand regulating control to the control unit, and
    the control unit receives the second control instruction, and cancels the demand regulating control on the basis of the second control instruction.

4. A demand regulating system according to claim 3, wherein the input unit displays the fact that the first operation is received, and transmits the first request information to the operation unit in accordance with the first operation,
    the control unit notifies the input unit of the execution of the demand regulating control, and
    while the demand regulating control is being executed, the input unit displays the fact that the second operation is received, and transmits the second request information to the operation unit in accordance with the second operation.

5. A demand regulating system according to claim 1, wherein the priority information includes associations among identification information of the consumer, identification information of each of the plurality of control-target devices, and the priority of each of the plurality of control-target devices,
    the results information includes associations among the consumer identification information, the identification information of the plurality of control-target devices, and the first control instruction,
    the first request information includes the consumer identification information, and
    the operation unit specifies the plurality of control-target devices on the basis of the results information and the first request information, and changes the priority of each of the plurality of control-target devices in the priority information.

6. A demand regulating system according to claim 1, wherein the priority information includes a priority for each time period,
    the results information includes information indicating a time for the first control instruction, and
    the operation unit specifies the plurality of control-target devices and the time period of the first control instruction on the basis of the results information and the first request information, and changes the priority of each of the plurality of control-target devices in the specified time period in the priority information.

7. A demand regulating system according to claim 1, wherein the operation unit specifies the consumer on the basis of the first request information, selects a latest control instruction for the consumer on the basis of the results information, recognizes the consumption device that is the target of the selected control instruction and the time period of the selected control instruction, and changes the priority of the recognized consumption device in the recognized time period in the priority information.

8. A demand regulating system according to claim 1, further comprising:
    a specific device input unit that is provided in the demand side equipment and is associated beforehand with a specific device, which is one of the plurality of control-target devices, receives a third operation by the consumer, and transmits third request information requesting a change of the priority of the specific device, to the operation unit in accordance with the third operation,
    wherein the operation unit, upon receiving the third request information, specifies the specific device on the basis of the results information and the third request information, and changes the priority of the specific device in the priority information.

9. A demand regulating system according to claim 8, wherein the specific device input unit receives a fourth operation by the consumer, and transmits fourth request information requesting the cancellation of the demand regulating control for the specific device, to the operation unit in accordance with the fourth operation, the operation unit, upon receiving the fourth request information, specifies the specific device on the basis of the results information and the fourth request information, and transmits, to the control unit, a third control instruction indicating the cancellation of the demand regulating control for the specific device, and the control unit receives the third control instruction, and cancels the demand regulating control for the specific device on the basis of the third control instruction.

10. A demand regulating system according to claims 1, wherein the resource is electric power.

11. A demand regulating apparatus, comprising:
a storage unit that stores priority information indicating a priority of each of a plurality of consumption devices that consume a resource supplied from a supply facility; and
an operation unit that receives measurement information indicating a measurement result for consumption of the resource by the plurality of consumption devices, calculating a regulating quantity of demand for the resource on the basis of the measurement information, selecting from among the plurality of consumption devices, on the basis of the priority information and the regulating quantity, a plurality of control-target devices, which are targeted for demand regulating control reducing consumption of the resource, transmitting a first control instruction instructing the demand regulating control to demand side equipment that includes the plurality of control-target devices, and storing results information indicating the first control instruction in the storage unit,
wherein the operation unit, upon receiving from the demand side equipment first request information requesting a change of the priority of each of the plurality of control-target devices, specifies the plurality of control-target devices on the basis of the results information and the first request information, and reduces the priority of each of the plurality of control-target devices in the priority information, and
wherein the operation unit increases the priority of each of the plurality of control-target devices in the priority information when a prescribed period of time has elapsed following the reducing of the priority of each of the plurality of control-target devices in the priority information.

12. A consumption device management apparatus comprising:
a control unit that stores priority information indicating a priority of each of a plurality of consumption devices that consume a resource supplied from a supply facility, receiving measurement information indicating a measurement result for consumption of the resource by the plurality of consumption devices, calculating a regulating quantity of demand for the resource on the basis of the measurement information, selecting from among the plurality of consumption devices, on the basis of the priority information and the regulating quantity, a plurality of control-target devices, which are targeted for demand regulating control reducing consumption of the resource, transmitting a first control instruction instructing the demand regulating control to demand side equipment that includes the plurality of control-target devices, receiving the first control instruction from an operation apparatus that stores results information indicating the first control instruction, and executing the demand regulating control for the plurality of control-target devices on the basis of the first control instruction; and
an input unit that receives a first operation by a consumer, and transmitting first request information requesting a change in the priorities of the plurality of control-target devices, to the operation apparatus in accordance with the first operation,
wherein the operation apparatus, upon receiving the first request information, specifies the plurality of control-target devices on the basis of the results information and the first request information, and reduces the priorities of the plurality of control-target devices in the priority information, and
wherein the operation unit increases the priority of each of the plurality of control-target devices in the priority information when a prescribed period of time has elapsed following the reducing of the priority of each of the plurality of control-target devices in the priority information.

13. A demand regulating system according to claim 12, wherein the priority information includes associations among identification information of the consumer, identification information of each of the plurality of control-target devices, and the priority of each of the plurality of control-target devices,
wherein the results information includes associations among the consumer identification information, the identification information of the plurality of control-target devices, and the first control instruction,
wherein the first request information includes the consumer identification information, and
wherein the operation unit specifies the plurality of control-target devices on the basis of the results information and the first request information, and changes the priority of each of the plurality of control-target devices in the priority information.

14. A demand regulating system according to claim 12, wherein the priority information includes a priority for each time period,
wherein the results information includes information indicating a time for the first control instruction, and
wherein the operation unit specifies the plurality of control-target devices and the time period of the first control instruction on the basis of the results information and the first request information, and changes the priority of each of the plurality of control-target devices in the specified time period in the priority information.

15. A demand regulating system according to claim 12, wherein the operation unit specifies the consumer on the basis of the first request information, selects a latest control instruction for the consumer on the basis of the results information, recognizes the consumption device that is the target of the selected control instruction and the time period of the selected control instruction, and changes the priority of the recognized consumption device in the recognized time period in the priority information.

16. A demand regulating system according to claim 12, further comprising:
a specific device input unit that is provided in the demand side equipment and is associated beforehand with a specific device, which is one of the plurality of control-target devices, receives a third operation by the consumer, and transmits third request information requesting a change of the priority of the specific device, to the operation unit in accordance with the third operation, wherein the operation unit, upon receiving the third request information, specifies the specific device on the basis of the results information and the third request information, and changes the priority of the specific device in the priority information.

17. A demand regulating system according to claim 11, wherein the priority information includes associations among identification information of the consumer, identification information of each of the plurality of control-target devices, and the priority of each of the plurality of control-target devices, wherein the results information includes associations among the consumer identification information, the identification information of the plurality of control-target devices, and the first control instruction, wherein the first request information includes the consumer identification information, and wherein the operation unit specifies the plurality of control-target devices on the basis of the results information and the first request information, and changes the priority of each of the plurality of control-target devices in the priority information.

18. A demand regulating system according to claim 11, wherein the priority information includes a priority for each time period, wherein the results information includes information indicating a time for the first control instruction, and wherein the operation unit specifies the plurality of control-target devices and the time period of the first control instruction on the basis of the results information and the first request information, and changes the priority of each of the plurality of control-target devices in the specified time period in the priority information.

19. A demand regulating system according to claim 11, wherein the operation unit specifies the consumer on the basis of the first request information, selects a latest control instruction for the consumer on the basis of the results information, recognizes the consumption device that is the target of the selected control instruction and the time period of the selected control instruction, and changes the priority of the recognized consumption device in the recognized time period in the priority information.

20. A demand regulating system according to claim 11, further comprising:

a specific device input unit that is provided in the demand side equipment and is associated beforehand with a specific device, which is one of the plurality of control-target devices, receives a third operation by the consumer, and transmits third request information requesting a change of the priority of the specific device, to the operation unit in accordance with the third operation, wherein the operation unit, upon receiving the third request information, specifies the specific device on the basis of the results information and the third request information, and changes the priority of the specific device in the priority information.

* * * * *